United States Patent Office 3,532,672
Patented Oct. 6, 1970

3,532,672
RESINOUS PRODUCT FOR PAPER SIZING AND A PROCESS FOR PRODUCING THE SAME
Masaki Takahara, 13 Sakuranocho-6-chome,
Toyonaka-shi, Japan
No Drawing. Filed Jan. 23, 1967, Ser. No. 610,812
Int. Cl. C08f 1/78, 15/40
U.S. Cl. 260—78.5                                5 Claims

ABSTRACT OF THE DISCLOSURE

A hydrocarbon resin for paper sizing, which is pale yellow and soluble in alkalis and alcohols to form a clear transparent solution, and has acid value of more than 50. The resin is prepared by polymerizing a mixture of hydrocarbon residue from petroleum refining and unsaturated organic acids or anhydrides thereof at 10°–150° C. in the presence of a radical polymerization catalyst such as azobis isobutylodinitrile. The polymerized product is then neutralized with an alkaline solution and an aqueous portion recovered and concentrated to prepare a sizing agent for paper.

---

Hydrocarbon resin as well as natural resin has heretofore been used as a sizing agent for paper. Hydrocarbon resin has a low acid value, which is at most 20 and is not fitted for a longterm preservation, particularly in summertime. Furthermore, slime is formed due to elevation of water temperature and emulsion is prone to destruction owing to slight acidity of pulp slurry, whereby the so-called pitch trouble occurs. Still more, since such sizing agent is trained, whiteness of paper as a finished article is deteriorated.

Conventional hydrocarbon resins have been prepared by adding $\alpha,\beta$-organic unsaturated acids or the corresponding anhydrides thereof such as maleic acid and fumaric acid to a mixture of hydrocarbon residue obtained from petroleum refining and cation copolymerizing the resultant mixture in the presence of such catalyst as ethyl etherate of trifluoride boron at a temperature below 70° C.

An object of the present invention is to provide a resinous product for paper sizing, which has stability in shelf life.

Another object of the present invention is to provide a resinous product for paper sizing, which is high in whiteness.

A further object of the present invention is to provide a process for producing a resinous product for paper sizing which is easily soluble in alkalis and alcohols, which comprises preparing the same from a mixture of hydrocarbon residue obtained from petroleum refining using a radical polymerization catalyst.

The present invention relates to a hydrocarbon resin for paper sizing agent, and to a process for producing the same.

The resinous product of the present invention is of hydrocarbon resin type, which conforms with the standard of natural resin. The present resin is pale yellow, and has acid value of 190–220. It is soluble in alkalis and lower alcohols to form a transparent colorless solution.

The resinous product of the present invention can be obtained by polymerizing a mixture of hydrocarbon residue with a mixture of $\alpha,\beta$-unsaturated acids or the corresponding anhydrides thereof in the presence of a radical polymerization catalyst at 70°–150° C. The resultant polycondensation product (which is pale yellow) is neutralized with an aqueous alkali solution and the resulting aqueous portion is concentrated, thereby to obtain a sizing agent.

In the present invention, cracked gasolines (including modified gasoline) or cracked residues thereof from which aromatic hydrocarbon is recovered may be used as starting material. These starting materials are rich in straight chain unsaturated hydrocarbon and have boiling point of 20–300° C.

$\alpha,\beta$-unsaturated acids or the corresponding anhydrides thereof used in the present invention include maleic acid, fumaric acid, crotonic acid, itaconic acid, acrylic acid and methacrylic acid. Citric acid capable of producing these unsaturated acids on heating may also be used. These acids may be mixed with the aforesaid hydrocarbon in a proportion of 1.5:100~10:100 by weight based on the weight of the hydrocarbon.

The catalyst used in the present invention is of radical polymerization catalyst type. Azobis isobutylodinitrile is most preferably employed therefor. In addition thereto, cumene hydroperoxide and tertiary butylperbenzoate may also be used.

It is preferable to employ polymerization temperatures ranging from 70° to 150° C. The polymerized product may be polycondensated with the aforesaid hydrocarbon, if necessary. The polymerized product thus obtained is in milky white. This polymerized product is neutralized with addition of an aqueous sodium hydroxide solution, an aqueous portion is separated from an organic portion and the former is concentrated to prepare sodium salt in the form of grain. Other alkalis, e.g. ammonia may of course be used in place of sodium hydroxide.

Furthermore, the present invention includes paper sizing agents within the scope thereof, such as a paper sizing agent prepared by combining two or more kinds of alkali salts of resin acid in accordance with the present invention having different acid values so that the total acid value of the combined resins may be within a range of 190–220 and also a paper sizing agent prepared by combining an alkali salt of resin acid according to the present invention and natural resin (including modified rosin) so that the total acid value of the combined resin may be within a range of 190–220.

EXAMPLE 1

To a mixture of 100 g. of naphtha cracked oil having boiling point of 150°–300° C. and bromine value of 94 and 10 g. of maleic anhydride, was added 0.5 g. azobis isobutylodinitrile as a radical catalyst. The resultant mixture was condensed for about 10 hours on heating while keeping the reaction temperature at 70°–85° C. to obtain 45 g. of pale yellow synthetic resin acid having an acid value of 205. Thus obtained condensation product was neutralized with an alkali solution, the resulting aqueous portion was separated from an insoluble gasoline portion (saturated portion which is non-condensable) and the aqueous portion was concentrated to obtain 51 g. of paper sizing agent in the form of a dried powdery alkali salt.

EXAMPLE 2

To a mixture of 100 g. of naphtha cracked oil same as used in Example 1 and 10 g. of acrylic acid, was added 0.5 g. of azobis isobutylodinitrile. The resultant mixture was condensed for about 24 hours on heating at a reaction temperature of 100–135° C. to obtain 32 g. of pale yellow synthetic resin oil having an acid value of 208. Thus obtained condensation product was treated in the same manner as in Example 1 to obtain 41 g. of paper sizing agent in the form of dried powdery alkali salt.

EXAMPLE 3

To a mixture of 100 g. of naphtha cracked oil same as used in Example 1, 10 g. of maleic anhydride and 5 g. of synthetic resin acid obtained either in Example 1 or Example 2, was added 0.5 g. of azobis isobutylodinitrile as a catalyst. The resultant mixture was condensed for about 6 hours on heating while maintaining a reaction temperature at 70°–85° C. Thereafter, 1 g. (active ingredient being 47%) of ethyl ether of trifluoride boron was gradually dropped thereto while keeping a reaction temperature at 30° C. and the reaction was continued for about 3 hours to obtain 60 g. of pale yellow synthetic resin acid having an acid value of 206. The thus obtained synthetic resin acid was treated in the same manner as in Example 1 to obtain 68 g. of paper sizing agent in the form of a dried powdery alkali salt.

EXAMPLE 4

To a mixture of 100 g. of the same cracked oil as in Example 1, 25 g. of maleic anhydride, 0.5 g. of azobis isobutylodinitrile was added. The resultant mixture was condensed for about 12 hours on heating at a reaction temperature of 110°–150° C. to obtain 73 g. of synthetic resin acid having an acid value of 350.

EXAMPLE 5

To a mixture of 80 g. of the same cracked oil as in Example 1 and 60 g. of synthetic resin acid abtained in Example 4, was added 0.5 g. of azobis isobutylodinitrile as a catalyst. The resultant mixture was condensed for about 15 hours at a reaction temperature of 70°–75° C. Thereafter, 1 g. of ethyl ether of trifluoride boron was gradually dropped therein while maintaining a reaction temperature of 60° C. and the reaction was continued for about 60 hours to obtain 95 g. of pale yellow synthetic resin acid having an acid value of 210. Then, the obtained acid was treated in the same manner as in Example 1 to prepare 108 g. of paper sizing agent in the form of a dried granular alkali salt.

EXAMPLE 6

To a mixture of 100 g. of $C^5$ fraction (being mainly composed of $C^5$:70–75% and $C^6$:30–25% and having diene value of about 80, bromine value of about 140 and specific gravity of 0.697 15°/s°) and 10 g. of maleic anhydride, was added 0.5 g. of azobis isobutylodinitrile. The resultant mixture was condensed in an autoclave for about 12 hours while keeping a reaction temperature of 10°–70° C. to obtain 78 g. of pale yellow synthetic resin acid having an acid value of 105.

EXAMPLE 7

37 g. of resin acid having an acid value of 350 obtained in Example 4 and 67 g. of resin acid having an acid value of 120 obtained in Example 6 were mixed to obtain 100 g. of a mixed resin acid having an acid value of 205. The thus obtained mixed resin acid was neutralized with an alkali solution to prepare 114 g. of paper sizing agent in the form of dried powdery alkali salt.

EXAMPLE 8

15 g. of synthetic resin acid having an acid value of 350 obtained in Example 4 and 85 g. of natural rosin having an acid value of 180 were mixed to obtain 100 g. of a mixed resin acid having an acid value of 203. From the thus prepared mixed resin acid, 114 g. of paper sizing agent was obtained in the form of an alkali salt.

EXAMPLE 9

To a mixture of 100 g. of the same cracked oil as in Example 1, 10 g. of maleic anhydride and 5 g. of tall rosin, was added 5 g. of azobis isobutylodinitrile as a catalyst. The resultant mixture was condensed for about 8 hours on heating while a reaction temperature at 70°–85° C. Thereafter, 1 g. (active ingredient being 47%) of ethyl ether of trifluoride boron was gradually dropped therein while keeping a reaction temperature at 30° C. and the reaction was continued for about 3 hours to obtain 60 g. of pale yellow synthetic resin acid having an acid value of 203. The thus obtained synthetic resin acid was treated in the same manner as in Example 1 to prepare 68 g. of paper sizing agent in the form of a dried powdery alkali salt.

Tests on sizing effect of the finished articles obtained in the above-mentioned examples were carried out by the present inventor under the following conditions, the results of which are as shown in the following table.

Samples for the sizing test were prepared by heating kraft pulp in a beater to adjust the beater content to a beating degree of SR28°. Separately, each of the sizing agents obtained in the above-example which had been diluted with 10 volumes of water was employed as a sizing agent for the test, which was respectively added to the beater content in an amount of 0.5% or 1% (in term of alkali salt of dissolved condensation product) based on the weight of dried paper pulp. 1.2% of aluminum sulfate based on the weight of the dried pulp was then added thereto and the mixture was adjusted to a pH of 4.5, which was then subjected to sizing and beating. Thus obtained pulp slurry was fed into Tappi Standard Sheet Machine and converted into a paper sheet of 63 g./m.$^2$ by usual procedure. The obtained paper sheet was air-dried and then subjected to heat curing for 5 minutes at 100° C. to prepare sample paper sheet. The measurement of sizing degree was carried out according to Japanese Industrial Standards P–8122. Controls in the following table represent the results obtained in case rosin sizing agents A and B, which are the best products among those commercially available, were employed.

| Sizing agent | | Sizing degree (second) | | |
|---|---|---|---|---|
| Sample | Amount employed percent | Average value | Maximum value | Minimum value |
| The present product: | | | | |
| (Ex. 1) | 0.5 | 43 | 58 | 28 |
| (Ex. 2) | 0.5 | 41 | 54 | 28 |
| (Ex. 3) | 0.5 | 42 | 52 | 32 |
| (Ex. 4) | 0.5 | 0 | 0 | 0 |
| (Ex. 5) | 0.5 | 40 | 50 | 30 |
| (Ex. 6) | 0.5 | 0 | 0 | 0 |
| (Ex. 7) | 0.5 | 39 | 54 | 24 |
| (Ex. 8) | 0.5 | 41 | 54 | 28 |
| (Ex. 9) | 0.5 | 38 | 52 | 24 |
| Control: | | | | |
| A | 0.5 | 29 | 38 | 20 |
| B | 0.5 | 23 | 30 | 26 |
| The present product: | | | | |
| (Ex. 1) | 1.0 | 57 | 74 | 30 |
| (Ex. 2) | 1.0 | 60 | 84 | 36 |
| (Ex. 3) | 1.0 | 61 | 85 | 37 |
| (Ex. 4) | 1.0 | 0 | 0 | 0 |
| (Ex. 5) | 1.0 | 62 | 88 | 36 |
| (Ex. 6) | 1.0 | 0 | 0 | 0 |
| (Ex. 7) | 1.0 | 60 | 86 | 34 |
| (Ex. 8) | 1.0 | 59 | 87 | 31 |
| (Ex. 9) | 1.0 | 56 | 72 | 30 |
| Control: | | | | |
| A | 1.0 | 47 | 69 | 25 |
| B | 1.0 | 42 | 64 | 20 |

What is claimed is:

1. A process for producing a naphtha resin (synthetic resin acid) which comprises polymerizing (a) a hydrocarbon mixture which contains unsaturated hydrocarbons, which is obtained directly from petroleum refining or petroleum cracking without any further treatment, and which has a boiling point of 20°–300° C. and (b) a member selected from the group consisting of an $\alpha,\beta$-unsaturated organic acid and the corresponding anhydride at 10°–150° C. in the presence of a radical polymerization catalyst.

2. A naphtha resin (synthetic resin acid) which is pale yellow, is soluble in alkaline solution and lower alcohols to provide a transparent solution, and is obtained by the process defined in claim 1.

3. A paper sizing agent obtained by saponifying a naphtha resin defined in claim 2 with an alkali solution.

4. A process as defined by claim 1 wherein said catalyst is an azo compound.

5. A paper sizing agent as defined by claim 3 obtained from a naphtha resin having an acid value of 190–220.

(References on following page)

References Cited

UNITED STATES PATENTS

| | | | |
|---|---|---|---|
| 2,383,399 | 8/1945 | Lundquist | 260—78 |
| 2,842,859 | 2/1958 | Fasce | 260—78.5 |
| 3,005,800 | 10/1961 | Powers et al. | 260—78.4 |
| 3,161,620 | 12/1964 | Perkins et al. | 260—78.4 |
| 3,211,683 | 10/1965 | Arakawa et al. | 260—78.4 XR |
| 3,255,139 | 3/1969 | Dinges et al. | 260—78.5 |

JOSEPH L. SCHOFER, Primary Examiner

J. KIGHT III, Assistant Examiner

U.S. Cl. X.R.

117—60; 260—78.4, 82